United States Patent [19]

Exeter

[11] Patent Number: 4,556,887
[45] Date of Patent: Dec. 3, 1985

[54] RADAR SYSTEMS

[75] Inventor: George M. Exeter, Ratho, Scotland

[73] Assignee: Ferranti plc, Cheadle, England

[21] Appl. No.: 398,216

[22] Filed: Jul. 14, 1982

[30] Foreign Application Priority Data

Jul. 24, 1981 [GB] United Kingdom ............... 8122752

[51] Int. Cl.$^4$ .................... G01S 13/58; G01S 13/00
[52] U.S. Cl. ................................. 343/8; 343/5 R
[58] Field of Search ............... 343/7 A, 8, 16 M, 8, 343/9 R, 9 PS, 14

[56] References Cited

U.S. PATENT DOCUMENTS

| | | | |
|---|---|---|---|
| 3,707,717 | 12/1972 | Frielinghaus | 343/9 X |
| 3,891,987 | 6/1975 | Jensen | 343/9 X |
| 3,967,284 | 6/1976 | White | 343/9 |
| 3,972,041 | 7/1976 | Howard | 343/7 A X |
| 4,184,154 | 1/1980 | Albanese et al. | 343/9 R |
| 4,234,881 | 11/1980 | Stavers | 343/8 |
| 4,301,453 | 11/1981 | Nieninger et al. | 343/9 R |

*Primary Examiner*—Charles T. Jordan
*Assistant Examiner*—Brian S. Steinberger
*Attorney, Agent, or Firm*—Kerkam, Stowell, Kondracki & Clarke

[57] ABSTRACT

A radar system includes signal processing means (SP) operable to determine the velocity relative to a receiving antenna (AR) of each object from which transmitted radiation is reflected. The signal processing means delivers signals representing the relative velocities of objects in each of a number of predetermined ranges of velocity values. Storage means (SM) are provided which comprise, for each increment of antenna bearing, a separate storage location for each of the ranges of velocity values. Circuit means (CM) are operable to read out the contents of the storage means and to modify signals delivered by the signal processing means (SP) in accordance with the contents of the storage means (SM) to provide output signals. In addition the circuit means (CM) is also arranged to further modify the output signals to provide new contents for the storage means.

15 Claims, 3 Drawing Figures

4,556,887

RADAR SYSTEMS

BACKGROUND OF THE INVENTION

This invention relates to radar systems and particularly, though not exclusively, to CW radar systems.

Clutter is a problem which affects all radar systems having co-located transmit and receive antennae, and is caused by the reflection of transmitted radiation from stationary objects close to the antennae. Clutter masking systems have been developed, particularly for pulse radars, and usually rely on recording the location of an object causing clutter in terms of antenna bearing (azimuth) and range. In a CW radar, instantaneous values of range are not readily available, and such techniques as do exist for determining range are generally too slow in response for the generation of clutter masks in the presence of moving targets. These techniques also produce what is known as the "doppler blind zone" within which genuine moving targets cannot be detected.

It is an object of the invention to provide a radar system having clutter-suppression arrangements which may be applied to CW radar as well as pulse radar.

SUMMARY OF THE INVENTION

According to the present invention there is provided a radar system which includes signal processing means operable to determine the velocity relative to a receiving antenna of each object from which transmitted radiation is reflected and to deliver signals indicative of the relative velocities of objects in each of a number of predetermined ranges of velocity values, storage means comprising, for each increment of effective antenna bearing, a separate storage location for each of the said number of predetermined ranges of velocity values, and circuit means operable to read out the contents of the storage means and to modify signals delivered by the signal processing means in accordance with the contents of the storage means to provide output signals and to further modify the said output signals to provide new contents for the storage means.

According to one aspect of the invention, the circuit means are arranged to subtract from the signals delivered by the signal processing means at one particular increment of antenna bearing the contents of the storage means resulting from the preceding antenna scan at the same increment of antenna bearing to provide the output signal.

According to another aspect of the invention the circuit means are arranged to attenuate the output signals representing one particular increment of antenna bearing by a predetermined amount and to add to the attenuated output signals those signals read out from the storage means resulting from the preceding antenna scan at the same increment of antenna bearing to provide the new contents of the storage means.

BRIEF DESCRIPTION OF THE DRAWINGS

The invention will now be described with reference to the accompanying drawings, in which.

DESCRIPTION OF THE PREFERRED EMBODIMENT

Figure 1:
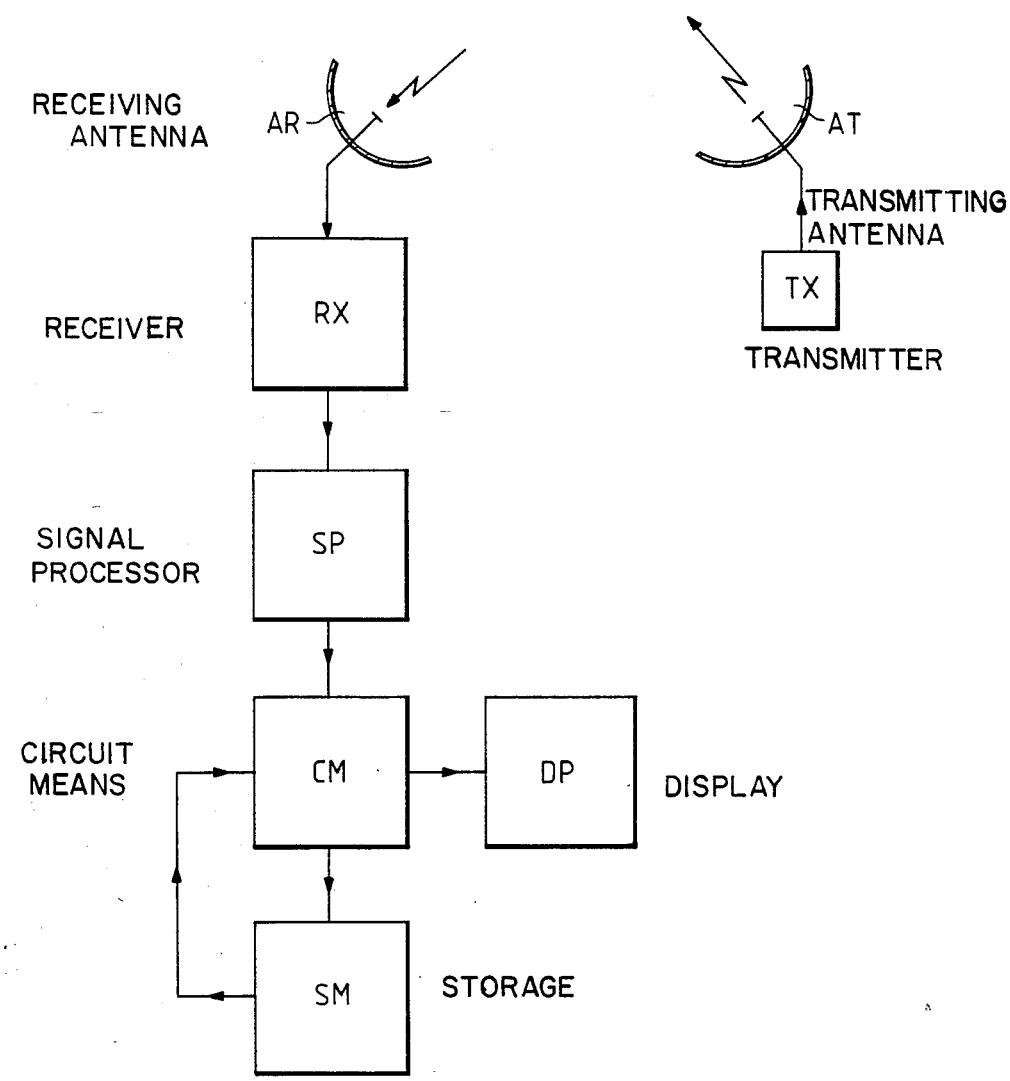
FIG. 1 is a schematic block diagram of a radar system.

Referring now to FIG. 1, this shows a receiver RX connected to a receiving antenna AR. As already stated this antenna may be mechanically movable, or may have an electrically-steerable beam. The receiver RX is associated with signal processing means SP, such as a doppler processor, for determining the velocity of targets. The circuit means CM accepts the outputs of the processing means SP and modifies these to produce output signals, say to a display DP. The circuit means CM further modifies the output signals and applies these to the storage means SM. The contents of the storage means may also be read out into the circuit means CM.

The receive antenna AR, or its beam, is steerable over an angle of up to 360°. This angle is divided up into increments, each representing a wedge-shaped volume of space. Any object in one of these wedges will reflect radiation if suitably illuminated, and hence will produce a signal in the receiver. The signal process will therefore provide outputs representing the velocity of each object so detected. It is preferable to provide separate outputs in each of a number of ranges of velocity values, say at 15 knot intervals. Hence the first output will represent objects having a velocity, relative to the receive antenna, of 0-15 knots, the second output will represent those with velocities between 15 and 30 knots, and so on. The amplitude of each signal will depend, amongst other factors, on the number of objects moving at velocities within that range.

The above situation is repeated for each increment of antenna bearing, or azimuth. Again by way of example, the azimuth scan of a continuously rotating antenna may be divided up into 600 increments, each 0.6 degrees wide. Each velocity range at each azimuth increment requires a separate storage location in the storage means SM. In addition, if the receive antenna also scans in elevation, each increment of elevation requires additional storage. It can be seen that the storage means thus requires a large number of separately-addressable storage locations. However, stores of this type and capacity are well known, and hence the storage means will not be described in detail. Some form of transmitter TX feeding radiation to an antenna AT is also required.

Figure 2:
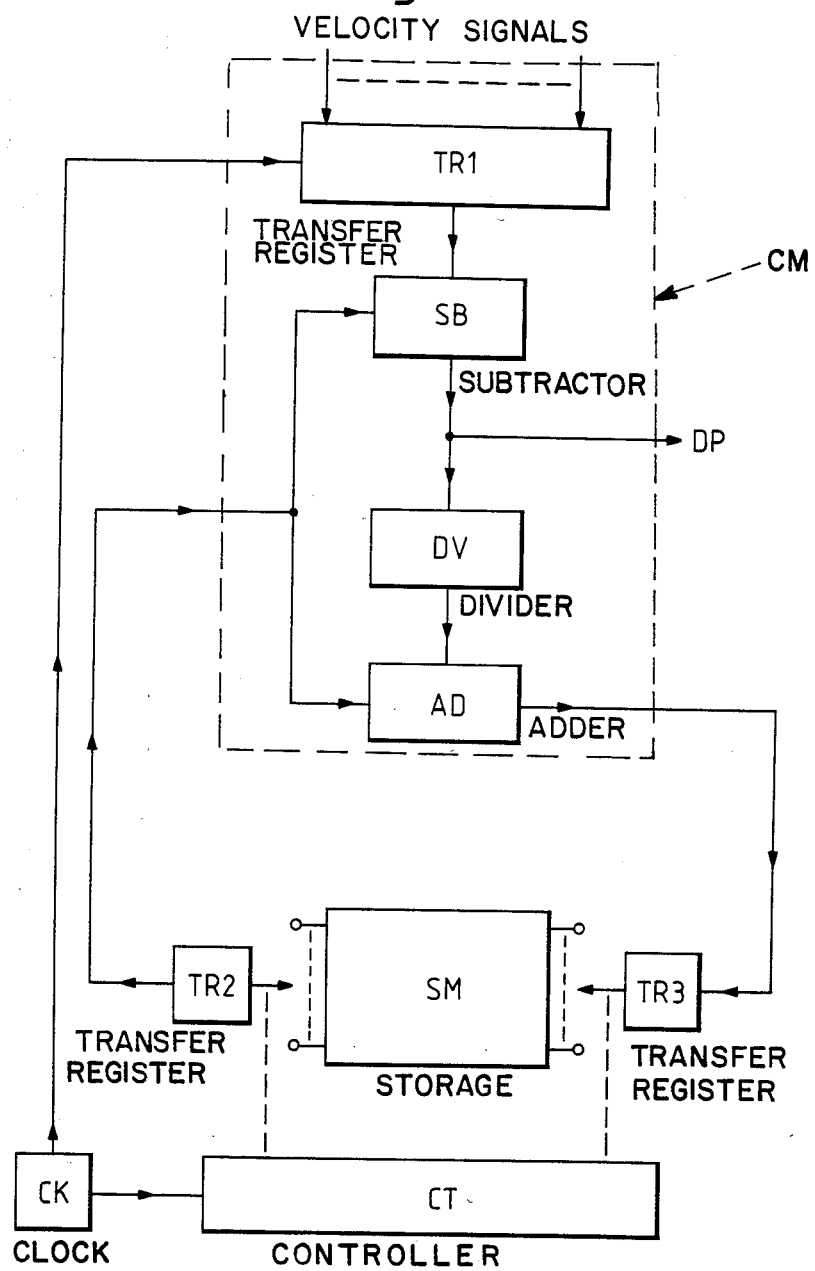
FIG. 2 is a block diagram of part of the system of FIG. 1.

The circuit means CM of FIG. 1 is shown in greater detail in FIG. 2. It will be appreciated that signals are applied simultaneously in each velocity range for each successive increment of azimuth or elevation. The circuit means shown therefore handles a number of signals in parallel, and is time multiplexed between each successive increment.

Referring now to FIG. 2, the circuit means includes a transfer register TR1 which accepts and stores the velocity signals from the signal processing means. The operation of the register TR1 is controlled by a clock pulse generator CK. For any particular increment of azimuth or elevation the outputs from the transfer register TR1 are the signals representing each velocity range, and these are applied to a subtractor SB. The contents of the storage means SM in locations corresponding to the particular increment of azimuth and elevation are read out by a second transfer register TR2 under the control of control means CT, and are applied to the subtractor SB. Here each stored velocity signal is subtracted from the corresponding "new" velocity signal from the register TR1. The resulting signals form the output signals, and are applied to the display DP (not shown). The output signals are also applied to a divider DV where their amplitudes are halved (i.e. a 6 dB attenuation is applied), and the resulting signals are applied to an adder AD. In the adder they are added to the signals read out from the store. The output of the adder AD, which will be referred to as a "mask" is then put into the store via transfer register TR3, in place of the information which had been read out.

The above process is repeated as the antenna scans, and it will be seen that after one complete scan cycle the storage means SM will contain a separate mask for each increment of azimuth and elevation. These masks are continually updated, and contain some representation of the velocity return pattern for each preceding scan.

Figure 3:
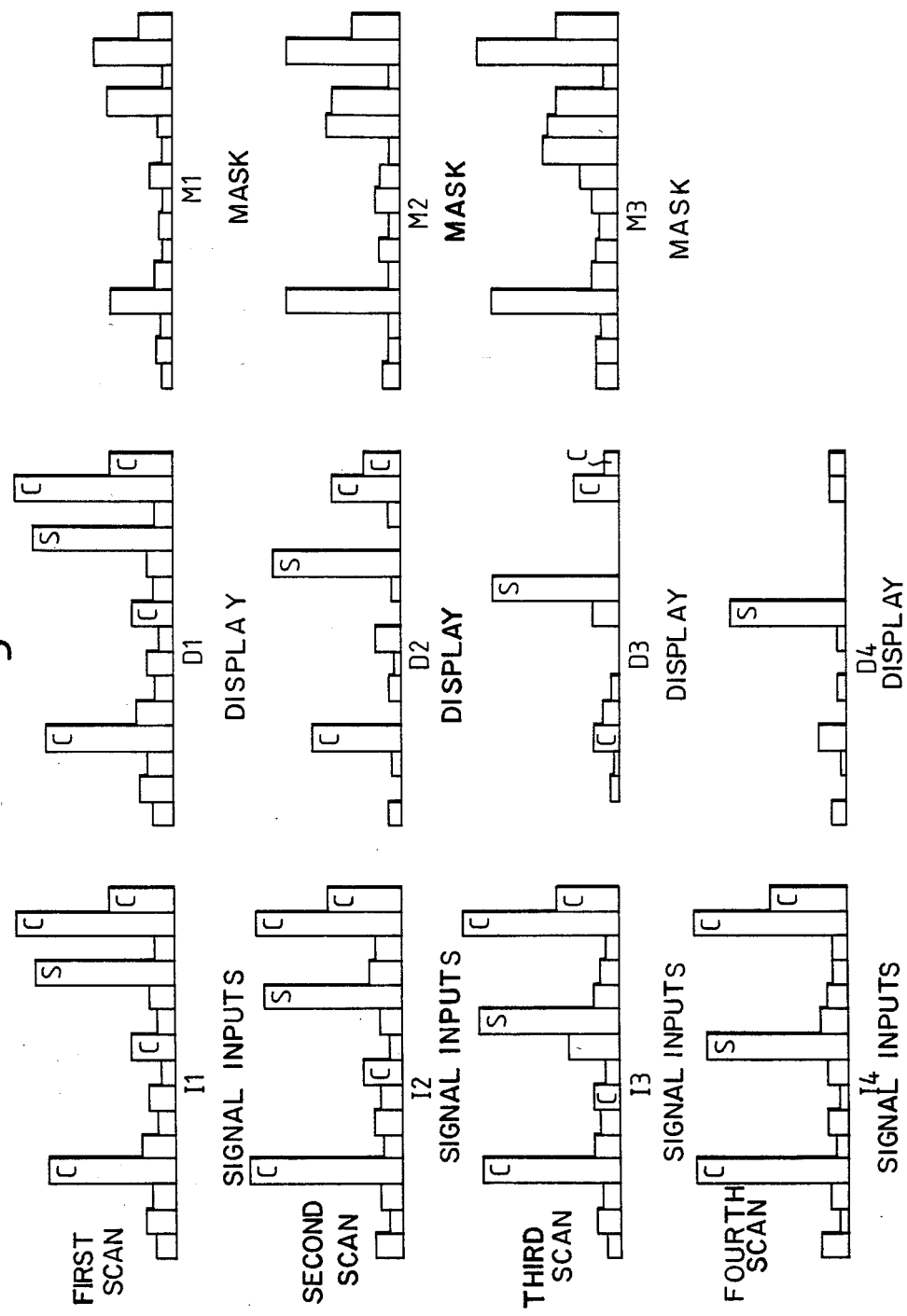
FIG. 3 shows a number of charts illustrating the operation of the invention.

FIG. 3 shows a number of bar charts illustrating the principle of operation of the invention. For the sake of simplicity only fifteen velocity ranges are shown, though in practice there would probably be many more. Each chart has velocity as its horizontal axis, the left-hand "bar" representing the lowest velocity range and the right hand bar the highest. The charts represent four successive scans at a particular azimuth and elevation increment. It is assumed that the scans start from switch-on, when there are no masks in the storage means SM.

The first chart, marked I1, shows the inputs to the circuit means from the signal processor in each of the fifteen velocity ranges. The signals marked C represent clutter which, as will be seen, tend to occur continuously, though possibly with varying amplitudes. This is because vibrating structures, whether machines or branches blowing in the wind, tend to have a particular resonant frequency which gives rise to a particular velocity return. The signal marked S represents a moving target.

Since initially the storage means does not contain any masks, the output signal to the display DP, shown in the chart marked D1, is identical with I1. The output signal is divided 2 in divider DV to give the first mask M1, which represents $I_1/2$, and is stored.

The next set of input signals derived from the same scan increment are shown at I2. The main clutter signals C are much the same, but the target signal S has moved, due to a change in velocity. The first mask M1 is retrieved from the storage means SM and subtracted in subtractor SB from the input signals I2 to give the new output signals D2 ($=I_2-I_1/2$). These are again divided by 2 in the divider DV and added to the first mask M1 in the adder AD to give a new mask M2 ($=I_2/2+I_1/4$). The second mask replaces the first in the store. The above process in repeated on each successive scan, and it will be seen that, for the nth scan with an input $I_n$, then the resulting output or display signal $D_n$ in any particular velocity range will be given by the series $$D_n = I_n - I_{n-1}/2 - I_{n-2}/4 - I_{n-3}/8$$

If input signals are due to clutter and are of constant magnitude I on each scan, then $$D_n = I(1 - \tfrac{1}{2} - \tfrac{1}{4} - \tfrac{1}{8} - \ldots), \text{ or zero}$$

Hence constant clutter is suppressed at 6 dB per scan and is cancelled out over a number of scans. This is shown in chart D4 of FIG. 3.

It is not considered necessary to describe in detail the various elements of FIG. 3, since all of these are well-known and readily available.

It will be appreciated that the arithmetic used in generating the masks may be adjusted. However, the simple system described above should be adequate for most situations. The mask generation system avoids problems such as the doppler blind zone referred to earlier, and is particularly suitable for use with CW radar systems, though it is also applicable to pulse doppler radar.

It has already been stated that some form of transmitter is necessary to provide the radiation which is reflected towards the receive antenna. The system may be a passive one, with a transmitter located at a different site, in which case a CW system avoids problems due to synchronisation. However, a monostatic pulse radar system may readily be used in conjunction with the invention.

We claim:

1. A radar system which includes signal processing means for determining the velocity relative to a receiving antenna of each object from which transmitted radiation is reflected and for delivering signals indicative of the relative velocities of the objects in each of a number of predetermined ranges of velocity values, storage means comprising, for each of a plurality of increments of antenna bearing, a separate storage location for each of the said number of predetermined ranges of velocity values, and circuit means comprising first means for reading out the contents of the storage means and for modifying the signals delivered by the signal processing means in accordance with the contents of the storage means to provide output signals, and second means for modifying the output signals in dependence upon the contents read out from the storage means to provide new contents for storage in the storage means in place of the contents read out.

2. A system as claimed in claim 1 in which the first means includes means for subtracting from the signals delivered by the signal processing means at one particular increment of antenna bearing the contents of the storage means resulting from a preceding antenna scan at the same increment of antenna bearing to provide the output signals.

3. A system as claimed in claim 1 in which the second means includes means for attenuating the output signals representing one particular increment of antenna bearing by a predetermined amount and for adding to the attenuated output signals the contents read out from the storage means resulting from a preceding antenna scan at the same increment of antenna bearing to provide the new contents for the storage means.

4. A system as claimed in claim 3 in which the attenuating means attenuates the output signals by 6 dB.

5. A system as claimed in claim 1 in which the signal processing means comprises doppler processing means.

6. A system as claimed in claim 1 which includes means for transmitting said radiation.

7. A system as claimed in claim 6, wherein said transmitting means includes means for transmitting CW radiation.

8. Apparatus for suppressing clutter in a radar system of the type that includes signal processing means responsive to radiation reflected from an object for determining the velocity of the object relative to a receiving antenna and for producing velocity signals indicative of the relative velocities of objects in predetermined velocity ranges, the apparatus comprising first means for storing first signals representative of object velocities in each of said predetermined velocity ranges during a first time period; second means for combining second velocity signals produced by the signal processing means during a second time period with the stored first velocity signals to reduce those of the second velocity signals which correspond to objects having substantially constant velocity and to produce output signals; third means for modifying the output signals in accordance with the first velocity signals to produce third velocity signals; and fourth means for replacing the first velocity signals stored in the storage means with the third velocity signals for application to signals produced by the signal processing means during a subsequent time period.

9. Apparatus according to claim 8, wherein said second means comprises means for subtracting the first velocity signals from corresponding ones of the second velocity signals to produce the output signals.

10. Apparatus according to claim 8, wherein the third means comprises means for attenuating said output signals, and means for adding the attenuated output signals to said first velocity signals to produce said third velocity signals.

11. Apparatus according to claim 8, wherein said fourth means comprises a transfer register for receiving said third velocity signals, and control means for causing the third velocity signals received by the transfer register to be written into the storing means.

12. Apparatus according to claim 8, wherein said receiving antenna is a scanning antenna having a plurality of antenna bearing increments, said signal processing means produces successive first velocity signals corresponding to each successive antenna increment, and the storing means has separate storage locations for the velocity signals corresponding to each of said increments.

13. Apparatus for supressing clutter in a radar system of the type that includes signal processing means responsive to radiation reflected from an object for determining the velocity of the object relative to a scanning receiving antenna and for producing velocity signals indicative of the relative velocities of objects in predetermined velocity ranges, the apparatus comprising means for storing, for each of a plurality of increments of antenna bearing, said velocity signals; means operative during each successive antenna scan and at each of said antenna bearing increments for reading the velocity signals corresponding to the predetermined velocity ranges for such increment which were stored in the storing means during a preceding antenna scan; means for subtracting the velocity signals read from the storing means from the velocity signals produced by the signal processing means for such increment to reduce those signals produced by the signal processing means which correspond to objects having substantially constant velocity and to produce output signals; means for combining the output signals with the velocity signals read from the storing means to produce updated velocity signals for such increment; and means for writing said updated velocity signals in said storing means in place of the signals read from said storing means to enable the updated velocity signals to be applied to the signals produced by the signal processing means during the next antenna scan.

14. Apparatus according to claim 13, wherein said combining means comprises means for dividing the output signals by a predetermined factor, and means for adding the divided output signals to the velocity signals read from the storing means to produce said updated velocity signals.

15. Apparatus according to claim 13 further comprising control means for controlling the reading means and the writing means to afford reading and writing of the storing means at each antenna bearing increment.

* * * * *